May 14, 1940.  F. L. BOLTON  2,200,665
PRODUCTION OF SALT BRINE
Filed Feb. 23, 1939  4 Sheets-Sheet 1
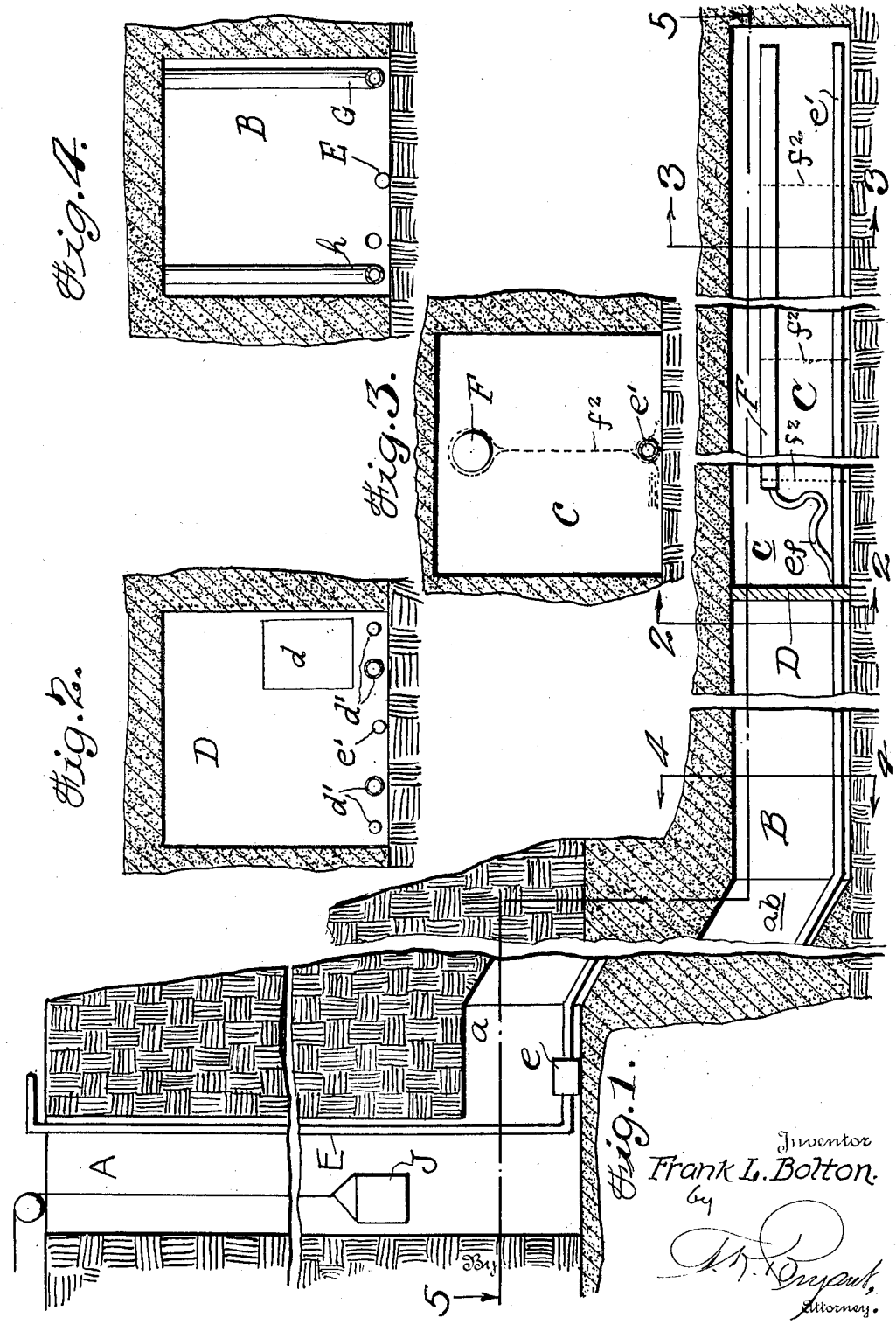
Inventor
Frank L. Bolton.
by
Bryant,
Attorney.

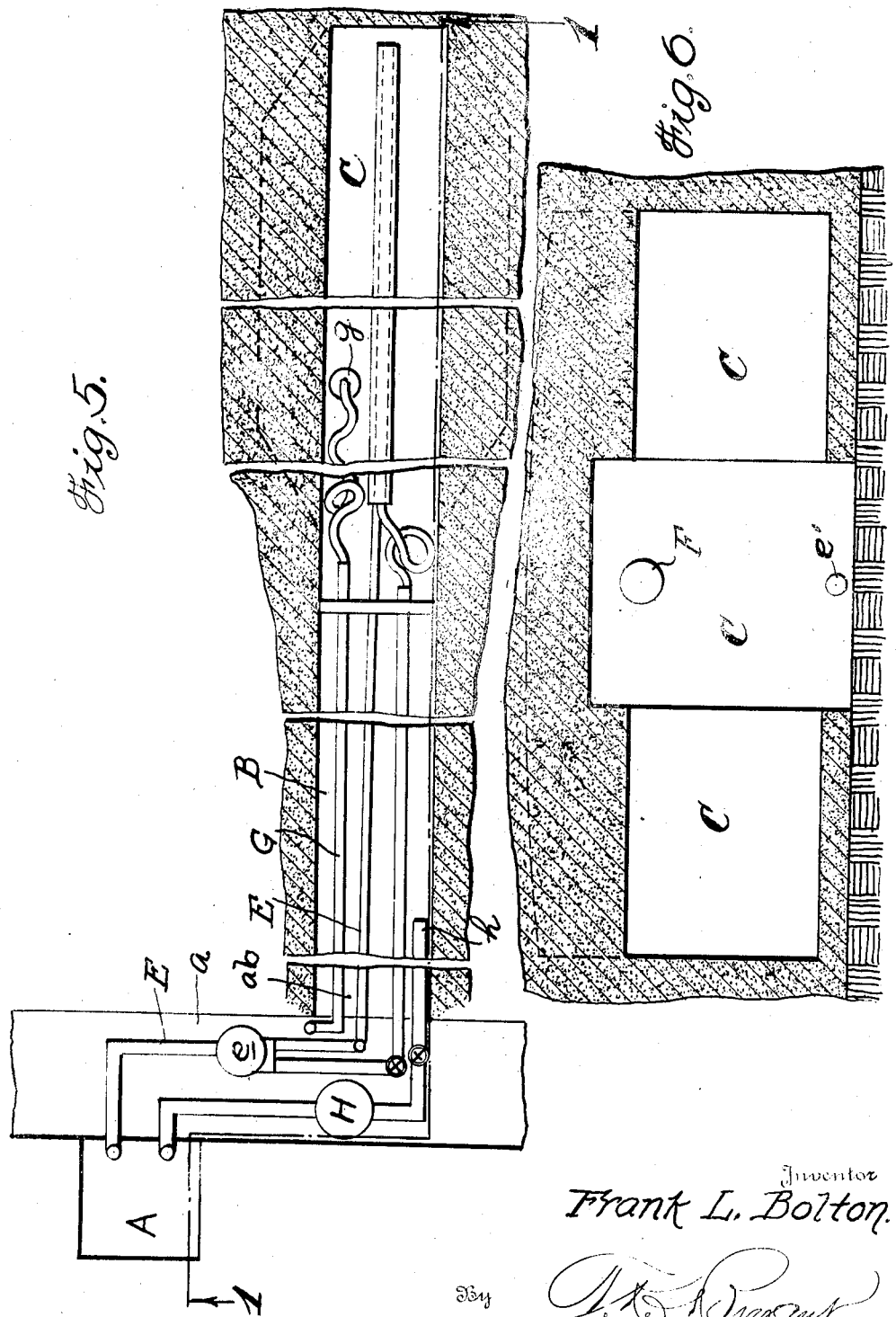

Inventor
Frank L. Bolton

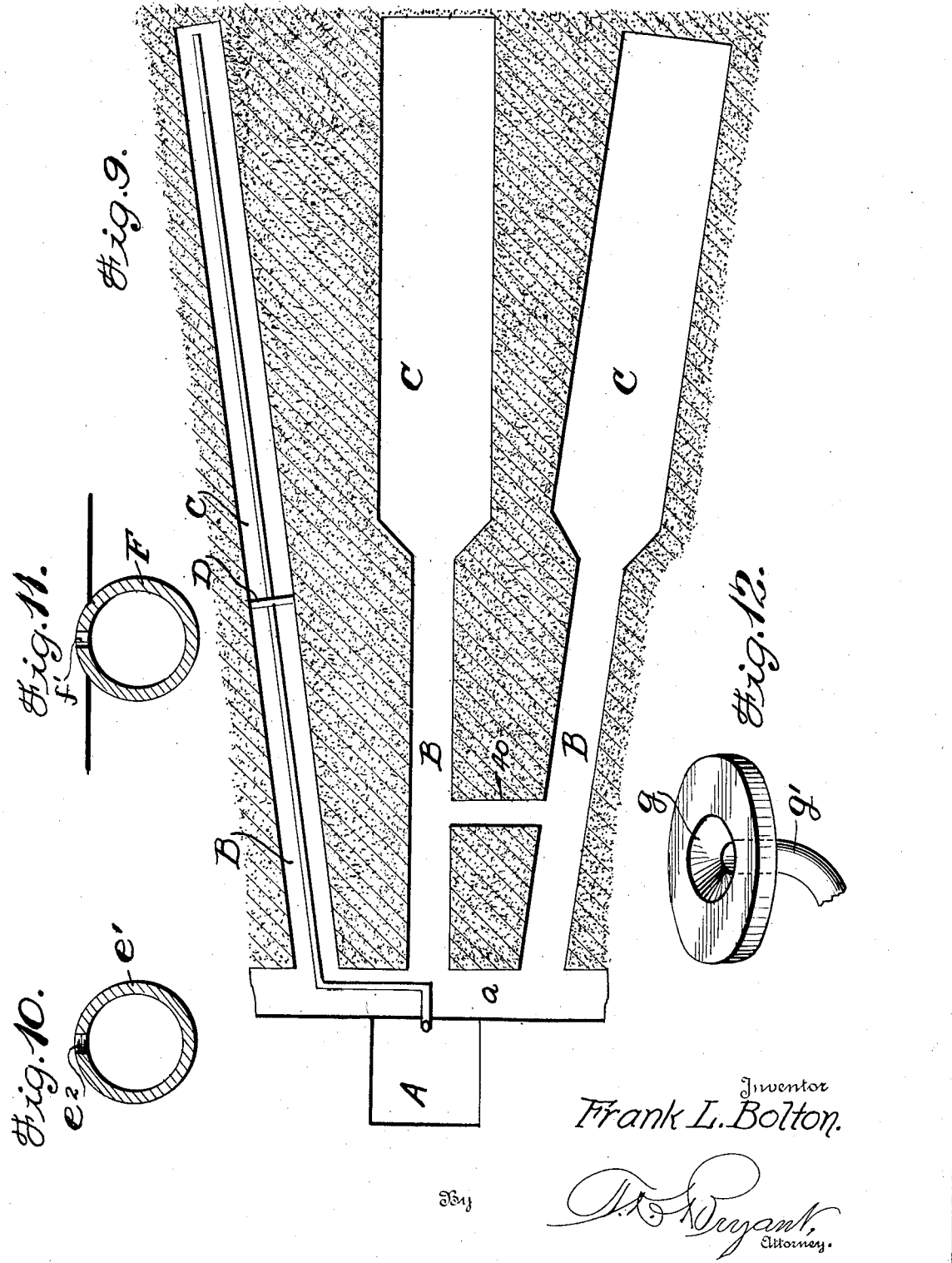

Patented May 14, 1940

2,200,665

UNITED STATES PATENT OFFICE 2,200,665

PRODUCTION OF SALT BRINE

Frank L. Bolton, Cayuga Heights, N. Y.

Application February 23, 1939, Serial No. 258,046

15 Claims. (Cl. 262—3)

This invention relates to the production of salt brine, in situ—production within the salt bed itself—under controlled conditions.

Salt brine in situ is now produced from salt wells, extending from the surface of the ground a distance of several hundred to several thousand feet to the bottom of the salt bed, which bed may vary from twenty feet to several hundred feet in thickness. Water is introduced into the salt bed through the well, dissolution of the salt takes place and the resulting brine is removed through the well to the surface.

The salt beds contain several soluble salts, but principally sodium chloride. They also contain insoluble matter, consisting of small particles with occasional larger insoluble formations, producing sediment and detritus when the soluble salts are dissolved. The salt beds are topped with various rock formations, the more common being limestone or gypseous shales, and these roof rocks will, when left unsupported by the removal of the salt, separate from their native beds and fall into the cavity, thus depositing detritus in the cavity and contaminating the brine content physically by riling it and chemically as the caved rocks contain some compounds that are soluble in water or brine.

As the cavity enlarges, the greatest enlargement is at the top of the salt bed where the fresh water comes in contact with the salt. As the water moves downward over the face of the salt, it absorbs smaller and smaller amounts of the salt, thus tending to give the cavity a roughly conical contour with the apex at the bottom center of the cavity. The deposition of the insoluble matter, being greater at the center, tends to further accentuate the formation of an inverted conical cavity, and as much of the salt in the bed is covered with insoluble matter near the center of the cavity, it can not be reached for dissolution and so is permanently lost and can not be reclaimed.

When a cave-in of the roof rocks occurs, the production of brine is stopped. The pipes are removed, the well redrilled to the bottom, the pipes replaced and the well again put into operation. When these cave-ins become frequent, and the production of brine therefrom is limited in amount and contaminated as to quality, the well must be abandoned.

In order to obtain capacity in production under this practice, a plurality of wells are sunk within a particular area—termed a field—and these are operated concurrently. Due to difficulty in providing exact similarity in operation and possible lack of uniformity in the salt bed formation, the wells vary as to strength of output, especially when operating on a continuous basis. As a result, there has been found to be a variation in the strength of the brine as between different wells in the same field, and even in the output of the same well when operating under practical commercial rates of production, the product varying from 92 to 98 percent of saturation.

The system presented by this invention differs fundamentally from present practices in a number of respects.

For instance, the brine produced is of substantially uniform percentage value of saturation with this value higher than can be obtained by the above described methods—the product percentage of saturation reaches to 100 percent, and is uniform.

The system, although designed for continuous operation, provides for sedimentation, curing and ripening, while the brine remains within the salt bed as well as providing storage facilities for finished brine, results not obtainable with present practices.

Also the system provides for a high degree of physical and chemical purity by eliminating the cave-in condition of present practice, thus avoiding contamination of the output. It also cuts down the time required to develop capacity conditions and contemplates the gradual development of a large area of the salt bed under efficient conditions as a field of operations, with increasing storage provided.

Other features will be apparent as the invention is hereafter disclosed in detail, the various features which combine to produce the efficient production of brine in situ—enabling the operation to be one entirely within control conditions, thus presenting a complete contrast with present practices.

To these and other ends, therefore, the nature of which will be more clearly understood as the invention is hereinafter disclosed, said invention consists in the improved processes and constructions hereinafter described in detail, illustrated in the accompanying drawings, and more particularly set forth in the appended claims.

In the accompanying drawings, in which similar reference characters indicate similar parts in the several views, Figure 1 is a view, somewhat diagrammatic in nature, indicating a vertical longitudinal section of an installed system for the production of brine in situ, the section being on line 1—1 of Figure 5.

Figures 2, 3 and 4, are cross-sections respectively of the tunnel of Figure 1 taken on line 2—2, 3—3, and 4—4 of Figure 1.

Figure 5 is a view, somewhat diagrammatic in nature, indicating a horizontal section on line 5—5 of Figure 1.

Figure 6 is a sectional view on line 3—3 of Figure 1, illustrating the conditions present after extended operation has enlarged the width of the dissolution chamber, the succeeding operation on the roof zone of the dissolution chamber being indicated in dotted lines.

Figure 9 is a diagrammatic sectional view on horizontal section, of a portion of a salt field, and illustrating a plurality of tunnels, one of which is active, with the remainder serving as storage chambers.

Figure 10 is a detail cross-sectional view of the bottom feed delivery section.

Figure 11 is a detail cross-sectional view of the floating conduit.

Figure 12 is a detail perspective of the floating end of the air conduit.

Figure 8:
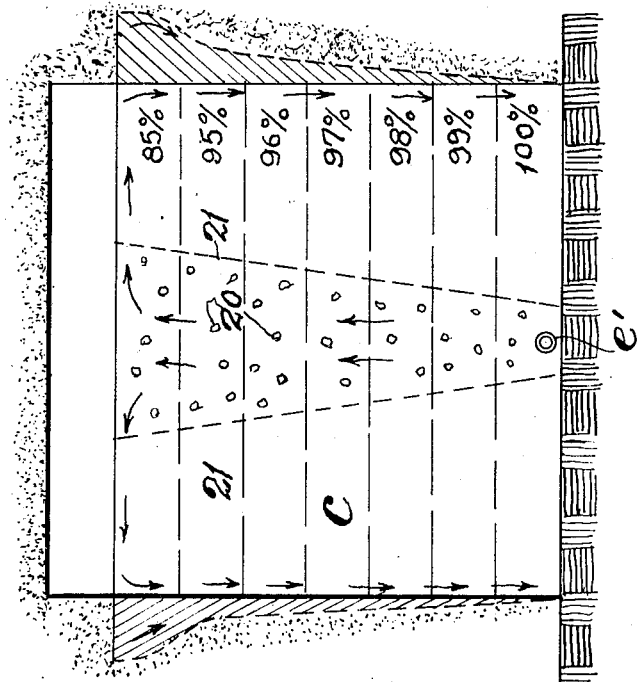
Figure 8 is a detail diagrammatic view taken at right angles to Figure 7, on an enlarged scale, and indicating approximate effects on the side walls of the dissolution chamber.

The system depends primarily upon the use of what is termed—for convenience in explanation—a control tunnel, a tunnel which extends horizontally for a desired distance from a working tunnel which connects with a shaft which extends to the surface of the ground, and with the remote end of the tunnel closed. The bottom of the tunnel is in the vicinity of the bottom of the salt bed; the tunnel is itself produced by the usual salt mining operations. The control tunnel is of desired cross-sectional dimensions, for instance, it may have its width and height eight feet by eight feet—this being illustrative only—and may have any desired length, to illustrate, the dissolution chamber, remote from the shaft, may have a length of 1,000 feet, while the sedimentation chamber, adjacent the shaft, will have a desired length. In the drawings, the shaft is indicated generally at A, the sedimentation chamber at B and dissolution chamber at C.

The two chambers are formed by providing a barrier D transversely of the tunnel, this barrier being of suitable material, such as wood or concrete and extends from floor to ceiling and the full width of the tunnel with a suitable thickness and being sealed into the side walls and roof of the tunnel. The barrier is provided with a sealable door or closure d to permit workmen to pass through when necessary, but is sealably closed when the system is in operation. The barrier also carries openings d' within its bottom zone, these openings remaining permanently open and may be in the form of tubes, if desired, and afford communication between the two chambers, and are designed to pass only brine of maximum saturation from the dissolution chamber to the sedimentation chamber, at a predetermined rate.

The walls of the dissolution chamber C adjacent the barrier, are treated in a suitable manner to retain them intact in presence of water or brine; this protection extends a suitable distance—50 feet, for instance—adjacent the barrier; the protection employed being indicated at c. The protection may be of any suitable form, as, for instance, by water-proofing and brine-proofing the salt walls within the zone and then coating such walls with a cement or asphalt coating for protection.

The bottom of the shaft A is indicated as at approximately the top level of the salt bed, the shaft being joined to the sedimentation chamber B by a working tunnel a and an inclined tunnel zone ab. These permit travel of the workmen from the shaft into the control tunnel area, and serve as a location for the conduits, piping, etc. that are employed to provide the operation. If desired, the pumping or control mechanisms may be located in the working tunnel a or in the inclined zone tunnel ab.

The dissolution of the salt is provided by delivering regulated quantities of water to the dissolution chamber by either surface feed or by bottom feed—if desired both forms of feed may be present to permit either being utilized as may be desired; the drawings illustrate the presence of both, but it is obvious that either may be employed alone with the other omitted.

The water supply is generally from above ground through piping E. If gravity feed alone be employed the delivery would be to suitable control valves e located in the working tunnel a; obviously, pumping mechanism may be located in the working tunnel, if desired, and the supply delivered to such mechanism, with the control valve e controlling communication with the piping of the control tunnel system; or the pumping mechanism may be located above ground with the control valves in the working tunnel—or the valves may also be located above ground. These are optional ways for securing the control of the delivery of the supply to the control tunnel piping system.

From the pumping mechanism or control valves the piping system is carried from working tunnel a through zone ab, the sedimentation chamber B, and through the barrier D, into the dissolution chamber where it is connected with the delivery section or sections. If bottom feed alone is employed, the delivery section e' will extend lengthwise of the bottom of the chamber, being provided with spaced-apart openings e2. With the surface feed employed alone the delivery portion is in the form of a floatable tubing section ef, of a length sufficient to permit the conduit F to rise to the desired extent. In the drawings, both bottom and surface feed conditions are illustrated, and where both are present, the piping system would preferably present separate pipe connections from pump or control valves e, with both connections valve-controlled, thus making it possible to use either type of water feed at will. If desired, openings e2 may be arranged with individual closures, such, for instance, as plugs, to permit control in the points of delivery in the bottom feed. As indicated, the length of the floating conduit F will be such as not to extend into the coated zone c, and would preferably be sufficiently less as to enable it to rise, when operating on the roof zone, to permit the ends of such latter zone to extend inclined.

The floatable delivery conduit F is preferably a tubular wooden container, closed at its ends, and extending the desired active length of the dissolution chamber. It may be of a continuous section as shown with one or more flexible connections with the delivery system, or of multiple sections, each with its flexible connection. It is of relatively large diameter, eighteen inches to two feet, for instance, so that there will be very little pressure loss within it as the water flows from the inlet end where the connection is made with flexible tube *ef* to the more remote end, the purpose being to have as nearly a constant pressure throughout its length as is possible, when the conduit is in operation.

The conduit, due to the ballast character of its content, will float almost submerged, as shown in Figure 11, and is provided with spaced openings *f'* lengthwise of the conduit at its top, the water passing through these on to the surface of the content of the dissolution chamber. The size of the openings and the spacing of the openings are so related and adjusted that when the water pressure in the conduit is at a determined amount, the rate of water input through the openings into the dissolution chamber will be the required amount to provide dissolution of the salt surfaces nearest to the respective openings.

To maintain the position of the floating conduit the latter is anchored to the bottom of the chamber by suitable flexible connections such as chains *f2*, these permitting the conduit to rise and fall with the surface of the chamber content during the activity of the system, the weight of the chains serving to retain the approximate position of the conduit, with the chain length sufficient to permit the conduit to rise to the maximum distance desired.

In addition, the chamber C may be provided with an air inlet and outlet to prevent the development of high pressure or a tendency to vacuum as the surface level of the chamber is raised and lowered within vertical limits above the roof of chamber B. Any desired form of structure may be utilized for the purpose, as, for instance, a pipe leading from the shaft to the top of the chamber. However, since the system contemplates raising the height of the chamber by dissolving the salt of the roof of the active portion of the chamber, it is preferable to utilize a floatable mouth for the air piping, indicated generally at G, in which case the mouth *g* is connected with the piping by a flexible connection *g'* having a length sufficient to permit the mouth to remain slightly above the surface of the content of the chamber. When the roof is being dissolved and the chamber is under pressure, the mouth will remain in contact with the roof and the air pressure will prevent the solution from entering the air system, so that when the surface of the solution is lowered, the air mouth will continue to function.

To remove the brine from the system a suitable pumping mechanism is provided, the pump mechanism, indicated generally at H, having its pump located at a desired point in the working tunnel *a*, or in zone *ab* depending upon relative elevations of pump location and surface of brine to be removed, and is provided with an intake *h* having its mouth at a suitable point some distance above the bottom plane of the sedimentation chamber, in order that the sedimentation material of the sedimentation chamber may not be drawn out with the brine content, and a sufficient distance below the operating level of the top of the sedimentation content so that air will not be drawn into the pump and break the suction. The pump delivery can be at any suitable point.

If above ground, the necessary piping can be carried up through the shaft A; if the system is designed to supply a transportation pipe line, the connections can lead to such line; if the system has developed, with the non-active tunnel or tunnels serving as storage, the connections can lead to the desired tunnel or tunnels.

In describing the possible location of the pumping mechanisms both supply and withdrawal, as well as valves, reference has been made to the possibility of locating these or either of them on the inclined portion *ab* of the sedimentation chamber. Under certain conditions of operation it may be necessary to move the mechanism up and down the bottom of the inclined portion of *ab*. The drawings do not present any details for permitting such shift of mechanism, since that involves only well known engineering practices, such for instance as providing a movable car on which the mechanism is located, to permit ready manipulation, thus in effect providing a shiftable portion of the shaft control station.

The shaft A may be equipped with any additional apparatus, such for instance as elevator J, or other equipment which may be found essential to take care of the system in operation.

In producing brine, two factors are present. Primarily, the action is set up by bringing water into contact with salt, the result being the dissolution of salt and its combining with the water, producing brine. This action is well known, as is the rapidity of the dissolution and the diffusion through the solvent to provide concentration values; if the content be agitated, the diffusion is rapid and the entire content rapidly becomes of substantially uniform concentration value. However, the present system is arranged in such manner that agitation of the content is at its minimum-partial mobility of content is present but is of low value, to enable the system to operate in the manner desired.

The rate of dissolution depends on the concentration of the solvent. To illustrate, it has been determined by tests (by Bolton and Whitman, 1938) that if a certain volume of pure water will dissolve approximately 312 pounds of salt per hour, a similar volume of brine of 10 percent saturation will dissolve 94 pounds of salt per hour; the same volume of 20 percent saturation will dissolve 74 pounds of salt per hour, while at 95 percent of saturation it will dissolve 2.5 pounds of salt per hour; at 99.99 percent of saturation (practically saturation) this volume will dissolve one pound of salt per hour.

As saturation develops, the specific gravity of the brine increases, until at maximum saturation it has increased approximately 20 percent. Hence, it is apparent that as the brine grows heavier it will tend to move downward within the body of the liquid, as long as the value below it is less than the particle of the solution (hereinafter referred to as "molecule") being considered; when the maximum saturation stage is reached further gravitation ends, while the molecules of less saturated value remain above.

These conditions tend to stratify the content in that molecules of similar specific gravity tend to produce somewhat of a horizontal layer effect, without however, presenting any divisions between layers.

The second factor is that of diffusion. The rate of dissolution pertains only to the actual contact of the solution with the salt, but by diffusion, the content intermediate the opposite sides receives saturation effect as well, under the well known laws of diffusion.

Figure 7:
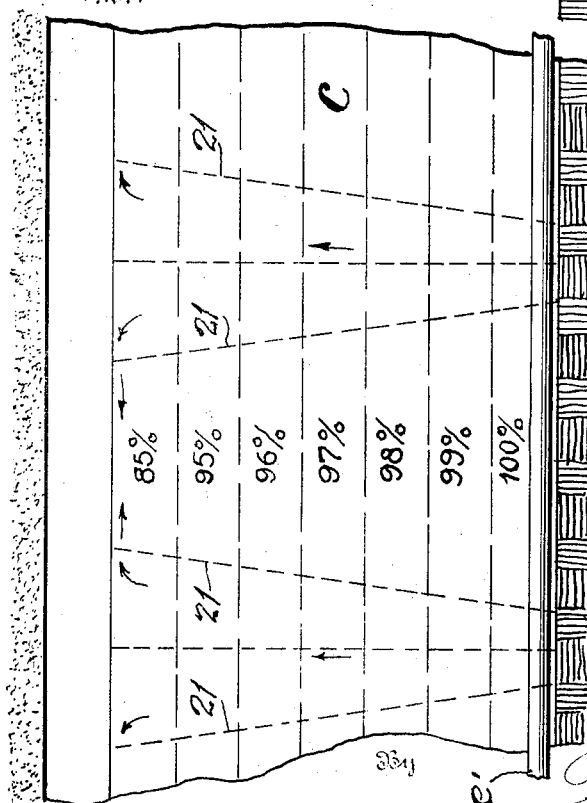
Figure 7 is a detail diagrammatic sectional view showing a fragment of a longitudinal zone of the dissolution chamber operating under bottom feed conditions, and illustrating roughly the stratified nature of the brine content, and the assumed effect of the diffusion presented, under bottom feed conditions.

The stratified content of the dissolution chamber when operating under bottom feed conditions and fixed surface level near the top of the chamber is shown in Figures 7 and 8. These illustrative diagrams also show by arrows the path of the fresh water from the inlet to the 100 percent saturation zone at the bottom of the chamber. The water is introduced at e' and rises to the top of the content, passing up by a bubbling action through the strata of varied concentrations. As a molecule travels upwardly more and more salt is taken up, from the surrounding brine, so that when it reaches the surface it is approximately 85 percent saturation. The solution then moves laterally along the surface to the side walls, spreading out longitudinally as well, and after contacting the side walls, passes down the salt face, becoming more and more concentrated until it reaches the bottom where it is 100 percent saturation. The zone of the intermediate portion of the content affected by the bottom feed is shown by the dotted lines 21. When surface feed is utilized the upward migration of the molecules of the intermediate zone is absent.

The system in operation tends to maintain the stratum of brine of maximum saturation value at the bottom of the dissolution chamber—from which the brine is removed—the stratum being maintained by the downward movement of molecules in contact with the side faces of the tunnel, since these molecules are being subjected to the most rapid changes in specific gravity, and pass into the fully saturated zone at the bottom.

Since the concentration value is least at the surface of the content, the molecules at that level will provide the greatest rate of "cutting-in" of the face, "cutting-in" referring to the removal of the salt by dissolution. With surface feed of water, this "cutting-in" distance will be greatest, since the water is then initially free of any saturation, and dissolution is at its most rapid rate; under the bottom feed, partial saturation is present at the surface, and the "cutting-in" distance is less. The relative "cutting-in" for different depths and concentrations of the solution is shown by the dotted lines in Figure 8, for a fixed level of the content.

The foregoing conditions are utilized in the present system for the purpose of producing a particular cycle of action designed to produce a particular result—the tendency to stratification of the brine content within the dissolution chamber with the stratum of maximum saturation at the bottom to provide a source from which the brine is removed. In addition the cycle provides for a minimum of agitation of the content, so that stratification is not destroyed and so that it is possible for the sediment contained in the salt bed to gravitate toward the bottom.

This general condition is not materially affected by the rise and fall of the surface level of the content. If there is a lowering of the surface level by increasing the rate of withdrawal of brine, the normal tendency would be to decrease the depth of the stratum of maximum saturation; but during this period the maximum cutting-in point is concurrently lowered, with the result that the time length of molecule migration to the bottom zone is reduced, so that the rate of replenishment of the bottom stratum is increased with the result that the increase in volume removed is compensated, in part at least, by the increase in supply to the stratum. When the surface level is being raised by a preponderance of water feed over removal of brine, the migratory time length of the molecules is also increasing, and tending to decrease the supply to the bottom stratum per unit of time, thus compensating, in part at least, for any tendency to materially increase the depth of such bottom stratum.

To prepare the system for actual service conditions it is necessary to have a layer of saturated brine at the bottom of the dissolution chamber. This may be provided by introducing water through piping E, with openings d' closed, to the desired depth, and allowing it to stand until fully saturated. Or, fully saturated brine may be introduced to the desired extent through piping E. Openings d' may then be freed from their closures, the sedimentation chamber allowed to receive the maximum concentration brine, under controlled conditions, so that the brine is allowed to "seek its level" as between the two chambers, and the system is ready for service.

It will be apparent that if the introduction of water to the dissolution chamber and the withdrawal of brine from the sedimentation chamber be regulated so as to make either superior in volume to the other—such superiority being in excess of any increase in volume of the chamber due to dissolution of the salt—the level of the content can be varied. Consequently the surface level may be alternately raised and lowered thus forming a cycle which can be repeated as often as desired. During such a cycle the lower stratum of concentration value will retain its maximum concentration values as explained above.

When the surface level of the content is being raised and lowered at a constant rate the increment "cutting-in" action will be of approximate uniform depth, so that the salt face of the side walls being removed will be planar in type. If, however, the supply of water and withdrawal of brine be controlled according to a pre-arranged regimen of intermittent operation, the salt face can be given somewhat of a serrated formation, an effect that would tend to increase the rate of output, since a greater facial area of the salt would be exposed to the action of the liquid. Various manipulations of supply and withdrawal are available to meet individual conditions of the salt bed, or the demands for salt brine output, and the proper practice in this respect can be readily developed without affecting the continuity of the brine making functions or the quality of the output.

When the desired width of the dissolution chamber has been reached, by the successive removal of increments of the side walls, the roof zone can be attacked by raising the content level of the chamber to bring its surface into contact with the roof. It is possible to provide somewhat of an arched shape to the roof, due to the fact that with either form of feed, the molecules of the liquid at the top center zone of the chamber will be of less concentration value than the molecules at the top sides of the chamber, so that the rate of dissolution will be highest in the top central zone, the lateral flow along the under side of the salt roof being made under conditions of greater saturation value, thus decreasing the rate of dissolution as the side walls are approached.

Both forms of feed, either separately or combined, can be manipulated so as to produce a desired contour of the roof. For instance, after the arched effect has been set up, the level of the content can be held out of contact with the salt roof, at the center so that there is no further dissolution in the central zone and the dissolution activity takes place in the more remote regions approaching the side walls of the chamber, thus gradually removing the salt toward the springing line of the arch effect, and ultimately producing a plane surface effect for the roof.

The dissolution of the roof can continue until substantially all the salt has been removed. Obviously until a point near the top of the salt bed is reached, the rock or shale formations above the salt bed will remain unexposed, so that cave-in actions of past practice are eliminated.

Two stages have been indicated for enlarging the dissolution chamber, by first enlarging the chamber laterally to approximately the final width, which can be held to limits such that cave-in conditions can not result, and then enlarging the resultant space vertically. Obviously, the stages can be varied, as by first increasing the width of the chamber to a partial extent, then a partial extent of the roof, to be followed by increasing the width, etc. The type of development to be preferred will depend upon the rate of production of brine desired, the ultimate width and depth of salt to be removed, and such factors.

Since the brine which passes to the sedimentation chamber is of maximum saturation value, the dimensions of that chamber remain practically constant. When the level of the surface of the solution in the dissolution chamber is higher than the roof of the sedimentation chamber, the latter will be under pressure, and the free surface of the content will find its proper level in the communicating and inclined portion of the tunnel ab.

Within the sedimentation chamber the brine is practically quiescent, so that sediment can gradually gravitate to the bottom during the detention period—a condition somewhat in contrast with the dissolution chamber where the continued entrance of water and the movements set up by the development of saturation tend to provide for continued but quiet movements within the chamber. Much of the sediment—the larger particles of material trapped within the salt bed during its formation—will be deposited in the dissolution chamber, but the smaller ones of these which would be kept in suspension by their lightness or by the movements of the content in the dissolution chamber, are given the opportunity to gravitate within the sedimentation chamber, thus aiding the clarity, curing and ripening of the brine.

As indicated in Figure 9, the system lends itself especially to operations within a salt bed field over a number of years. With the location of the shaft at an intermediate point, it is possible to arrange the tunnels connecting with the shaft through the working tunnel in any desired manner, for instance, it is possible to radiate the tunnels like the spokes of a wheel, with the shaft at the hub position; or any other arrangement of tunnels, with the sedimentation chamber in the direction of the working tunnel or the shaft, may be made so that the whole area is commanded and can be worked out without undermining the surface above the salt bed. By developing the tunnels successively, the second tunnel can be made active after the first has reached the end of its development. The first tunnel—now inactive as a producer of brine—can be prepared for storage purposes, the barrier may be removed if desired for brine of maximum saturation, the brine to be stored being taken from the sedimentation chamber of the second tunnel. This permits of the continued use of the first development as an underground storage unaffected by any material temperature changes or other variable conditions found on the surface, and with no likelihood of deterioration in strength, since the walls of the storage chamber are themselves formed of salt. In this way, the spent tunnel remains actively in service, for storage, curing and ripening of the brine to further improve it. When the second tunnel becomes spent for active production service, and a third tunnel is opened to production service, the first and second tunnels can be joined by a channel 40 at any convenient location, connecting the two chambers, as by a mining or drilling operation, so that both tunnel developments then become part of a greater storage development of the two developed tunnels, now intercommunicating; or the spent tunnels may remain independent storage chambers.

The system is obviously advantageous for cleaning and inspection purposes when desired. The tunnel can be pumped out, and the workmen can provide the cleaning, after which it is reprepared for service and the activities resumed. Due to the dimensions of the original tunnel, such cleaning activities can be had with maximum efficiency. Furthermore, during such periods, an inspection can be made of all control conduits and structures, and adjustments made as may be required by the then conditions. In excavating the tunnel initially, the salt that is removed by mining is not lost, but is treated as is usual with mined salt.

The system lends itself to subsequent chemical treatment of the brine in underground storage. After the raw brine has been produced in the dissolution chamber, and has passed into the sedimentation chamber where it has settled, cured and ripened, by natural means, it becomes a high quality product for many subsequent uses, and its production may, for these purposes, be considered finished, and the product ready for use. However, as pointed out above, the salt bed contains small amounts of soluble salts, in addition to sodium chloride, such as calcium sulphate and calcium oxide. In some chemical operations using brine, it is desired to remove some or all of these chemical impurities, prior to ultimate use of the brine. In such cases, under prior practice, the cured and ripened brine is subjected to chemical treatment for the removal of chemical impurities, in tanks on the surface.

For conditions such as these, the chemical treatment may be applied underground under this system with great resultant advantages over surface treatment. For instance, the brine being stored in one or more spent tunnels may be treated by the addition of chemicals, to remove the undesirable chemical impurities, and the sludge may be allowed to accumulate on the bottom of the chamber where the action takes place, permitting the cost of disposal to be eliminated. The tremendous size of the spent tunnels permits the use of one or more chambers for this purpose for many years, without the necessity of handling or disposing of the sludge. After the chamber becomes filled to a certain height with the sludge, it can be abandoned.

As is apparent the system is designed for large scale operations, but under conditions which will not only obtain maximum results but under comparatively low cost conditions as compared with present day practice. This is due to the fact that the shaft becomes the focal point from which a plurality of operations can be successively developed, each serving to set up a linear operation of extended length so that the field itself will, in the course of time, become fully exploited, and when exploited will include a large area. For instance, it would be possible to have a group of tunnels of such a length as to include an area of approximately a square mile or more; within this area the salt will have been removed to the maximum extent desired without, however, rendering the area unsafe above the salt bed. And while the salt has been removed, the space is being utilized for storage purposes of the commodity being produced—the brine—which was produced in the operation of removing the salt. While the initial cost of providing the shaft and several tunnels and installing the apparatus therein may be large, it is no larger than present day costs for similar capacity under present processes; and the fact that much of the apparatus can be transferred from tunnel to tunnel while the shaft installation remains permanent enables the operation to continue and progress at a low cost.

It is obvious that, in output, the system provides a great advance over present day practice, both as to quantity and quality, since it would require a number of independent cavity operations to produce the volume produced by a single tunnel, and the system enables the production of brine of maximum and uniform concentration values as well as physical and chemical values, superior to the most favorable results obtainable from the present day practice. In addition, the ability to further cure and ripen the brine in underground reservoirs is of immeasurable importance and a condition not possible in present day practice. Since the tidal effect set up by the cycle of alternate raising and lowering of the surface level of the content of the dissolution chamber enables the salt to be removed on the basis of vertical side walls in place of the sloping wall formation of present day practice, the volume of salt ultimately removed from the bed by the operation is largely increased over that possible under present day practice.

Other advantages of the system will be apparent, and need not be specifically referred to, excepting that of the underlying factor of the entire operation—the fact that the operation itself is of controllable character. It is possible to establish a regimen under which the results are of a definite character and then to maintain that regimen to produce a product uniform as to quality both physical and chemical, and of maximum strength, a condition which enables the system to form the supply for transportation by pipe lines, if desired, since assurance is had that the supply is of uniform quality conditions, and that the volume will be sufficient to meet all demands set up by the need of retaining such pipe lines active.

While I have herein disclosed a system together with several ways of providing for its operation under maximum value conditions, and have presented details of apparatus capable of being utilized in the operations, it will be understood that the disclosure is more or less illustrative in these respects, and that the exigencies of installation, service, etc., may require changes and modifications in the system, both as to operation and apparatus employed; nothing contained herein is intended to limit the application to any specific topographic conditions of the salt bed or to limit the number of shafts or tunnels nor the position, location, slope, size, length or shape of the same, and I therefore desire to be understood as reserving the right to make any and all such changes or modifications therein as may be found desirable or essential, insofar as the same may fall within the spirit and scope of the invention as expressed in the following claims when broadly construed.

I claim:

1. The method of producing brine of substantially uniform saturation consisting of establishing a substantially horizontal tunnel in a salt bed, dividing the tunnel into dissolution and sedimentation chambers communicating with each other at the bottom zones thereof for the delivery of brine of maximum saturation from the dissolution chamber to the sedimentation chamber for curing and withdrawal, and delivering water along the length of the dissolution chamber and withdrawing cured brine from the sedimentation chamber at rates to maintain maximum saturation of the bottom stratum of brine in the dissolution chamber and to control the level of the content in the dissolution chamber.

2. A method as in claim 1, wherein the water is fed along the length of the dissolution chamber at a rate to set up strata of gradually increasing brine saturation in a downward direction with the upper strata of lesser brine saturation contacting salt walls of the dissolution chamber to be enriched thereby for molecular gravitation to the bottom stratum zone.

3. A method as in claim 1, wherein the water delivery is to the surface of the upper stratum of the dissolution chamber to thereby effect increased initial increment removal of salt from the walls contacted by the upper stratum with such increment removal gradually decreasing in a downward direction during molecular gravitation activity to the saturated lower stratum.

4. A method as in claim 1, wherein the water delivery is to the bottom zone of maximum saturation for brine enrichment by travel upwardly through the strata to the surface stratum for subsequent molecular migration downwardly in contact with salt walls to the bottom zone of maximum saturation.

5. A method as in claim 1, wherein the supply of water to the dissolution chamber and withdrawal of cured brine from the sedimentation chamber are controlled to vary the surface level in the dissolution chamber and thereby effect vertical and lateral "cutting-in" of the roof and side walls of the dissolution chamber to control the cross-sectional dimensions of the dissolution chamber.

6. The method of producing brine of substantially uniform saturation strength and purity consisting of establishing a substantially horizontal tunnel in a salt bed closed at one end and having an operating shaft at its other end and placing an artificial barrier transversely of the tunnel to divide the same into a dissolution chamber and a sedimentation chamber with the latter adjacent the shaft, forming communication between the chambers adjacent and restricted to the bottom zone of the barrier, producing a bottom stratum of brine of maximum saturation in the dissolution chamber for delivery through the barrier to the sedimentation chamber, curing the brine in the sedimentation chamber, and delivering water along the length of the dissolution chamber and withdrawing cured brine from sedimentation chamber at rates to maintain the bottom stratum in the dissolution chamber of maximum saturation.

7. The method of producing brine of substantially uniform saturation strength and purity consisting of establishing a substantially horizontal tunnel in a salt bed closed at one end and having an operating shaft at its other end and placing an artificial barrier transversely of the tunnel to divide the same into a dissolution chamber and a sedimentation chamber with the latter adjacent the shaft, forming communication between the chambers adjacent and restricted to the bottom zone of the barrier, producing a bottom stratum of brine of maximum saturation in the dissolution chamber for delivery through the barrier to the sedimentation chamber, curing the brine in the sedimentation chamber, delivering water along the length of the dissolution chamber and withdrawing cured brine from the sedimentation chamber at rates to maintain the bottom stratum in the dissolution chamber of maximum saturation, and determining the level of the upper stratum in the dissolution chamber by the level of cured brine in the sedimentation chamber.

8. A method as in claim 1, wherein the rate of water delivery and brine withdrawal is such that the surface level is alternately raised and lowered without disturbing a minimum required depth of the bottom stratum of maximum saturation.

9. A method of producing brine of substantially uniform saturation wherein the brine is produced, cured and stored within a salt bed, the method consisting of successively establishing a series of substantially horizontal tunnels in a salt bed radiating from a working shaft with the outer ends closed and with the respective tunnels divided into dissolution chambers and sedimentation chambers with the latter communicating with the working shaft, forming communication between the bottom zones of the chambers for the delivery of brine of maximum saturation from the dissolution chambers to the sedimentation chambers for curing and withdrawal, delivering water along the length of the initially established dissolution chamber in a manner to produce a bottom stratum of maximum saturation for delivery to the sedimentation chamber and withdrawing cured brine from said sedimentation chamber until said initially established dissolution chamber is exhausted, thereafter working a second tunnel and forming communication between the sedimentation chamber of said second tunnel and said spent tunnel whereby the latter may be utilized as a storage chamber for the excess production of brine of maximum saturation.

10. A method as in claim 9, wherein the brine stored in a spent tunnel is chemically treated to cause precipitation of sludge and other foreign matter therefrom.

11. A system for producing and curing brine of substantially maximum saturation and purity within a salt bed comprising a shaft and working tunnel, a substantially horizontal production tunnel in the salt bed having one end closed and its other end in communication with said shaft and working tunnel, an artificial barrier extending transversely of the tunnel to form a dissolution chamber and a sedimentation chamber with the latter adjacent the shaft and working tunnel, said barrier being constructed to provide a communication between the bottom zones of the chambers for passage of brine of maximum saturation from the dissolution chamber to the sedimentation chamber, controllable means for delivering water along the length of the dissolution chamber and withdrawing brine from the sedimentation chamber, the rate of said supply and withdrawal being such as to limit the flow of brine of maximum saturation from the bottom stratum of the dissolution chamber into the sedimentation chamber.

12. A system as in claim 11, wherein the water supply means includes a ported pipe extending longitudinally of the bottom zone of the dissolution chamber.

13. A system as in claim 11, wherein the water supply means comprises a floatable ported pipe within the dissolution chamber arranged to discharge water at the surface of the contents of the dissolution chamber.

14. A system as in claim 11, wherein the water supply means includes a floatable surface feed member and a bottom feed member within the dissolution chamber selectively usable for controlling increment removal of salt from the walls of the dissolution chamber.

15. A system as in claim 11, wherein there is provided vent means in the dissolution chamber operable above the level of brine content therein and communicating with the shaft and working tunnel.

FRANK L. BOLTON.